June 26, 1934.    A. G. MACDONALD    1,964,294
DISPLAY CONTAINER
Filed June 30, 1932    7 Sheets-Sheet 1

INVENTOR
ALEXANDER. G. MACDONALD
BY J. T. O'Connell
ATTORNEY

June 26, 1934.  A. G. MACDONALD  1,964,294
DISPLAY CONTAINER
Filed June 30, 1932   7 Sheets-Sheet 2

INVENTOR
ALEXANDER G. MACDONALD
BY J.E.O'Connell
ATTORNEY

June 26, 1934.                A. G. MACDONALD                1,964,294
                              DISPLAY CONTAINER
                        Filed June 30, 1932          7 Sheets-Sheet 3

INVENTOR
ALEXANDER.G.MACDONALD
BY J.T.O'Connell
ATTORNEY

INVENTOR
ALEXANDER.G.MACDONALD
BY J.D.O'Connell
ATTORNEY

June 26, 1934.    A. G. MACDONALD    1,964,294
DISPLAY CONTAINER
Filed June 30, 1932    7 Sheets-Sheet 7

INVENTOR
ALEXANDER G. MACDONALD
BY J. L. O'Connell
ATTORNEY

Patented June 26, 1934

1,964,294

UNITED STATES PATENT OFFICE 1,964,294

DISPLAY CONTAINER

Alexander G. Macdonald, Montreal, Quebec, Canada

Application June 30, 1932, Serial No. 620,184

9 Claims. (Cl. 206—45)

This invention relates to display containers for tobacco and other commodities and has particular reference to containers in which individual packages are arranged in rows one behind the other.

As applied to containers of this type the present invention resides in providing novel means for supporting the packages of one or more rows in an upwardly displaced display position. In its preferred embodiment such means comprises a vertically displaceable tray containing the packages of each row to be displayed and suitable tray supports capacitated to automatically assume a tray supporting position as the tray is raised to its display position. When several rows of packages are to be displayed in this manner the supports for the trays containing the packages of the different rows are made of varying height to provide for a stepped arrangement of the trays in their elevated or display positions.

Proceeding now to a more detailed description reference will be had to the following drawings, wherein—

In describing the various types of containers shown in these drawings, reference will be had initially to the construction illustrated in Figs. 1 to 5 inclusive. As shown herein, the outer case of the container is in the form of an open-top rectangular box comprising a bottom wall 5, front and rear walls 6 and 7 and end walls 8. The front wall 6 is cut away as at 9 to provide a display aperture through which the contents positioned immediately adjacent said wall are exposed to view.

A row of individual packages 10, containing tobacco or other substances, is shown occupying the front portion of the outer case immediately adjacent the front wall 6. Similar packages 11 are arranged in a second row occupying the rear portion of the outer case and are contained in a vertically displaceable tray comprising a bottom wall 12, a rear wall 13, end walls 14 and a hinged lid 15, the latter being integrally joined to the upper edge of the rear wall 13. The two rows of packages are separated by an intervening removable partition 16 comprising a vertically disposed strip of cardboard having its lower edge resting on the bottom wall 5. The end portions of this partition strip 16 are bent forwardly as at 17 and then rearwardly as at 18 to provide double end-wall members which extend from the body portion of the partition strip to the front casing wall 6 and are fitted between the end casing walls 8 and the outer sides of the terminal packages 10 of the front row. The outer end wall plies 18 of the partition strip have their lower rear edge portions extended to form narrow tray supporting members 19, each of which terminates in a foldable flap 20. The height of the tray supporting members 19 and their flaps 20 may be varied within fairly wide limits but is herein shown as being approximately one-half the height of the main portion of the partition strip 16.

Figures 1, 2, 3, 5:
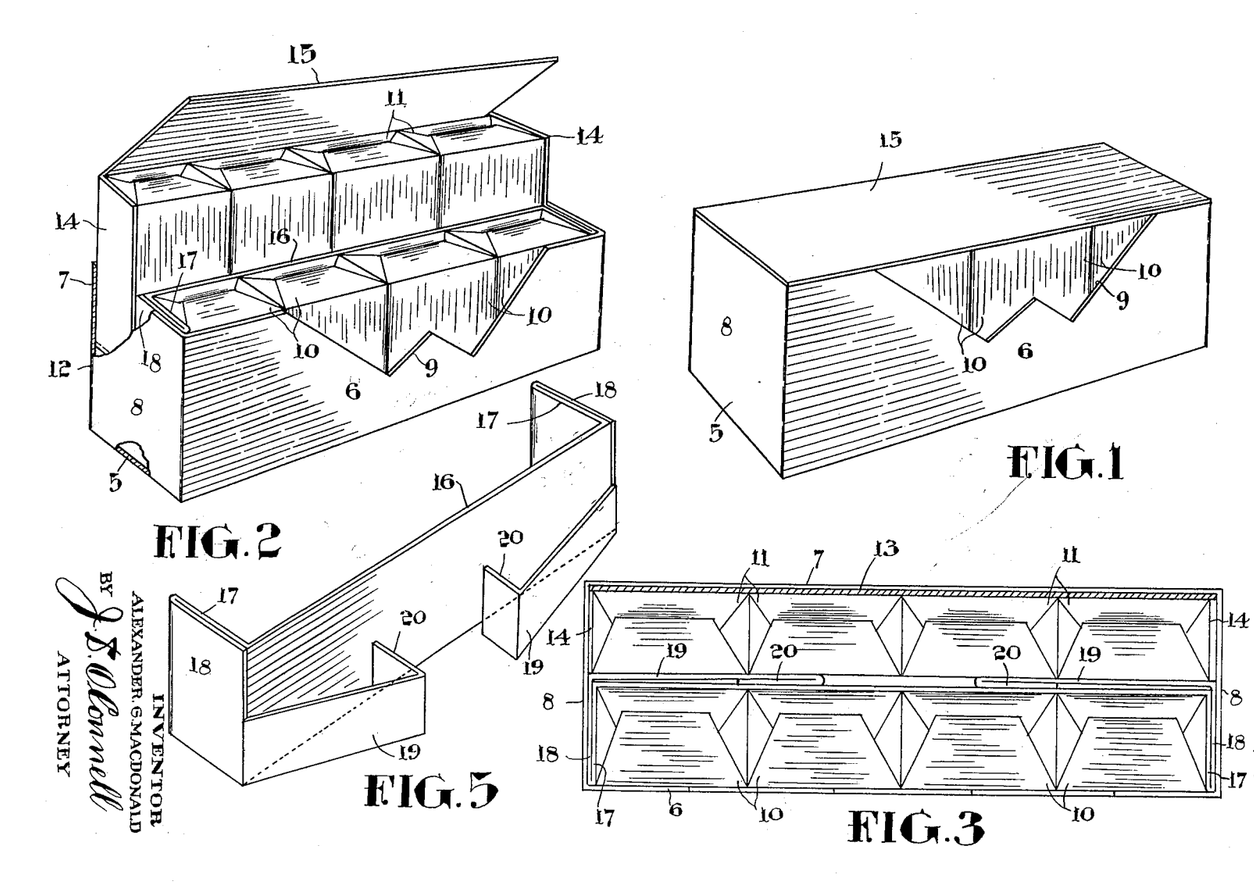
Fig. 1 is a perspective view of a closed container provided in accordance with this invention.
Fig. 2 is a view similar to Fig. 1 but showing the container open and the contents supported in display position.
Fig. 3 is a plan view of the arrangement illustrated in Fig. 1 but with the cover torn away to expose the contents and other interior elements.
Fig. 5 is a perspective view of a combined partition strip and tray support embodied in the construction illustrated in the preceding figures.
Figure 4:
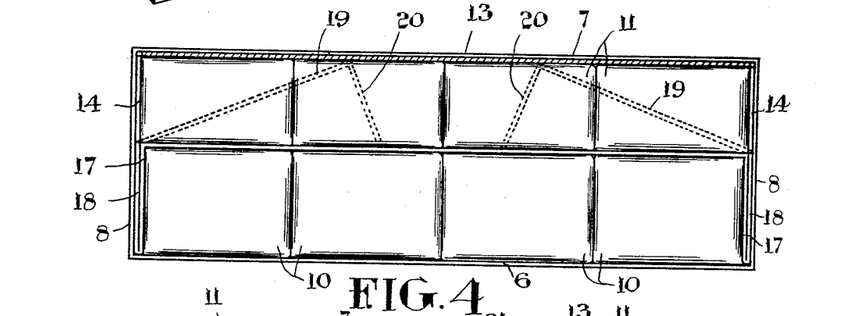
Fig. 4 is a plan view, similar to Fig. 3, of the arrangement illustrated in Fig. 2.

The normal position of the parts mentioned herein is that illustrated in Figs. 1 and 3 wherein the front row of packages 10 and the tray containing the rear row of packages 11 are shown resting flatly on the bottom wall 5 of the outer case so that the open top of the outer case may be closed, as shown in Fig. 1, by the lid 15 attached to the rear wall of the vertically displaceable tray. In this position of the parts the tray supports 19 extend lengthwise of the container in contact with the front surfaces of certain of the packages 11 (as shown to advantage in Fig. 3) while the flaps 20 are folded to lie flat between the tray supports 19 and the rear surface of the partition strip 16.

When the container is to be used for display purposes the lid 15 is swung to a vertical position and pulled upwardly to raise the tray containing the packages 11. When the bottom wall of the tray clears the upper edges of the tray supports 19 and their flaps 20 these elements automatically spring away from the partition strip 16 and assume the dotted line position illustrated in Fig. 4. In this position thereof the members 19 and 20 form supports on which the bottom wall of the tray containing the packages 11 is supported so that the upper portions of these packages are projected to a display position above the front packages 10.

Figure 6:
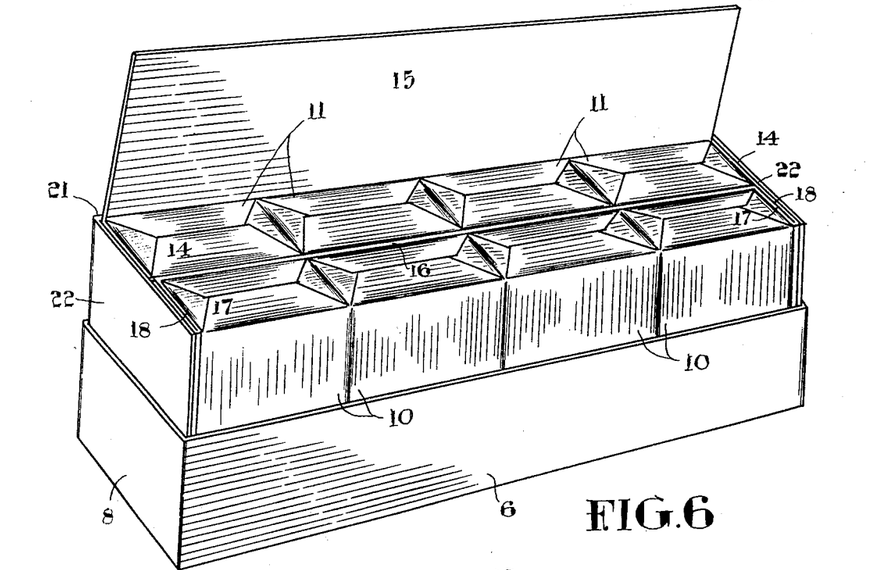
Fig. 6 is a perspective view of a modified container with the cover in open position.
Figure 7:
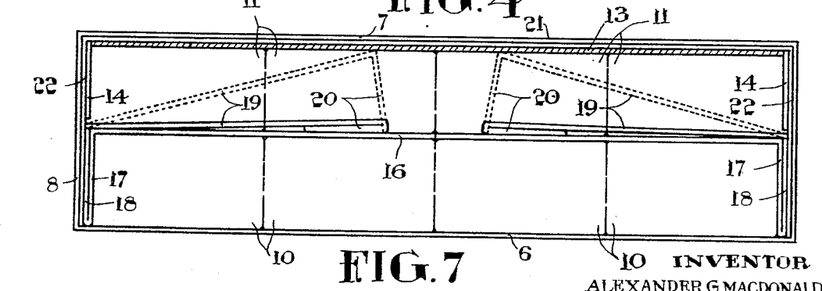
Fig. 7 is a top plan view of the construction illustrated in Fig. 6, the cover being broken away for the sake of clearness.
Figures 7A, 8:
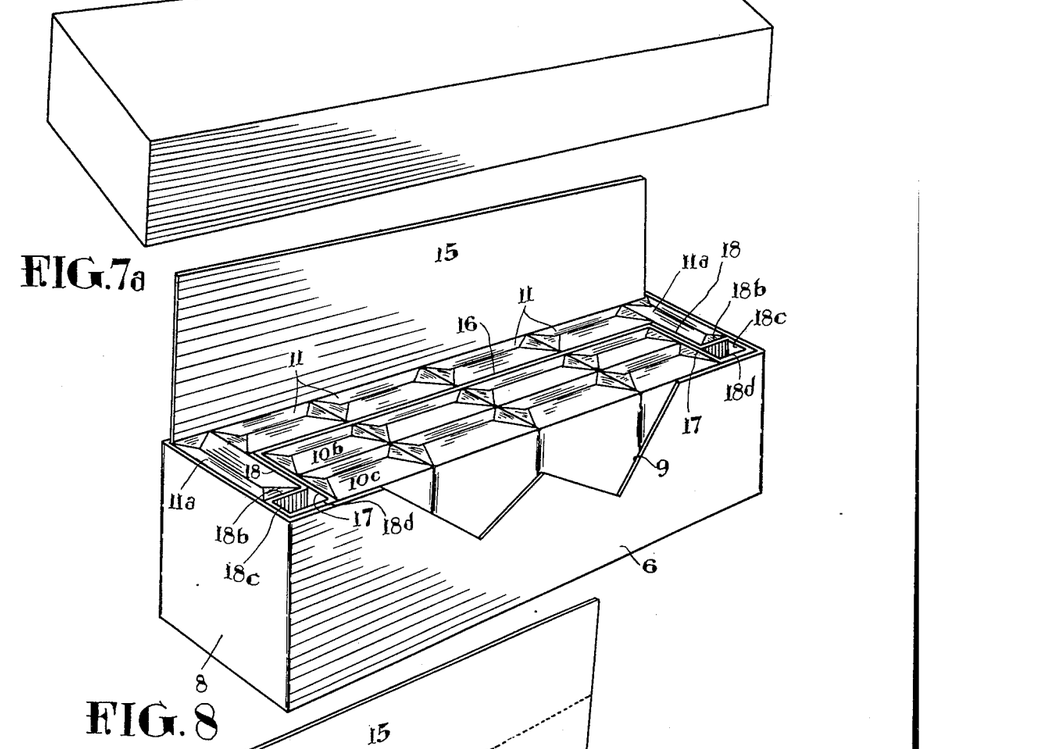
Fig. 7a is a perspective view of a supplementary slip cover adapted to be used in connection with the container appearing in Figs. 6 and 7.
Fig. 8 is a view similar to Fig. 6 but showing a further modification.

The construction shown in Figs. 6 and 7 is the same as that previously described except for a slight modification in the structure of the outer case. According to this modification the height of the outer casing walls 6, 7 and 8 is reduced to approximately one-half the height of the outer casing walls shown in the preceding figures. One advantage of this construction is that the packages 10 and 11 project a sufficient distance above the upper edges of said walls to effect satisfactory display of the packages 10 at the front of the outer casing without the necessity of providing a special display opening for this purpose such, for example, as the display opening 9 previously referred to. It is desirable, however, that a supplementary outer casing wall structure be provided to protect the portions of the packages 10 and 11 projecting above the outer casing walls 7 and 8. I therefore provide a supplementary wall structure or filler comprising a rear wall portion 21 and end wall portions 22. As shown more particularly in Fig. 7 the supplementary rear wall 21 is fitted between the wall 7 and the rear wall 13 of the tray containing the packages 11, while the supplementary end walls 22 are fitted between the end walls 8 and the terminal packages of the front and rear rows. These supplementary walls 21 and 22 are made of a height equal to the height of the said packages and have their outer surfaces spaced from the outer surfaces of the walls 7 and 8 a distance corresponding to the thickness of said walls. If desired, a slip cover such as that illustrated at 23 in Fig. 7a may be fitted over the upper portions of the packages 10 and 11 and the upper portions of the supplementary walls 21 and 22 so that the lower edge portions of the slip cover rest on the upper edge portions of the outer casing walls 6, 7 and 8.

In the further modification illustrated in Figs. 8 to 12 inclusive 3 rows of packages are arranged in the outer case and provision is made for supporting the terminal packages 11a of the rear row in a plane at right angles to the plane of the intermediate packages 11 contained in the same row. These packages 11 and 11a are carried by a vertically displaceable tray arranged adjacent the outer casing wall 7 and constructed in practically the same manner as the trays previously described. It will be noted, however, that the portions of the packages 11a which project forwardly beyond the bottom wall 12 of the tray are fitted in suitable spaces reserved between the end casing walls 8 and opposing portions of the outer end wall plies 18 of the partition strip 16, the latter being interposed between the packages 11 of the rear row and the packages 10b of the intermediate row. The front row of packages designated 10a are fitted in the outer casing between the packages 10b and the front casing wall 6. Portions of the outer end wall plies 18 of the partition strip 16 are bent at right angles as indicated at 18b, 18c and 18d to provide, with the inner end wall plies 17, rectangular fillers filling the forward corner spaces left between the packages 11a and the front casing wall 6 and between the plies 17 and the end casing walls 8.

Figures 9, 10, 11:
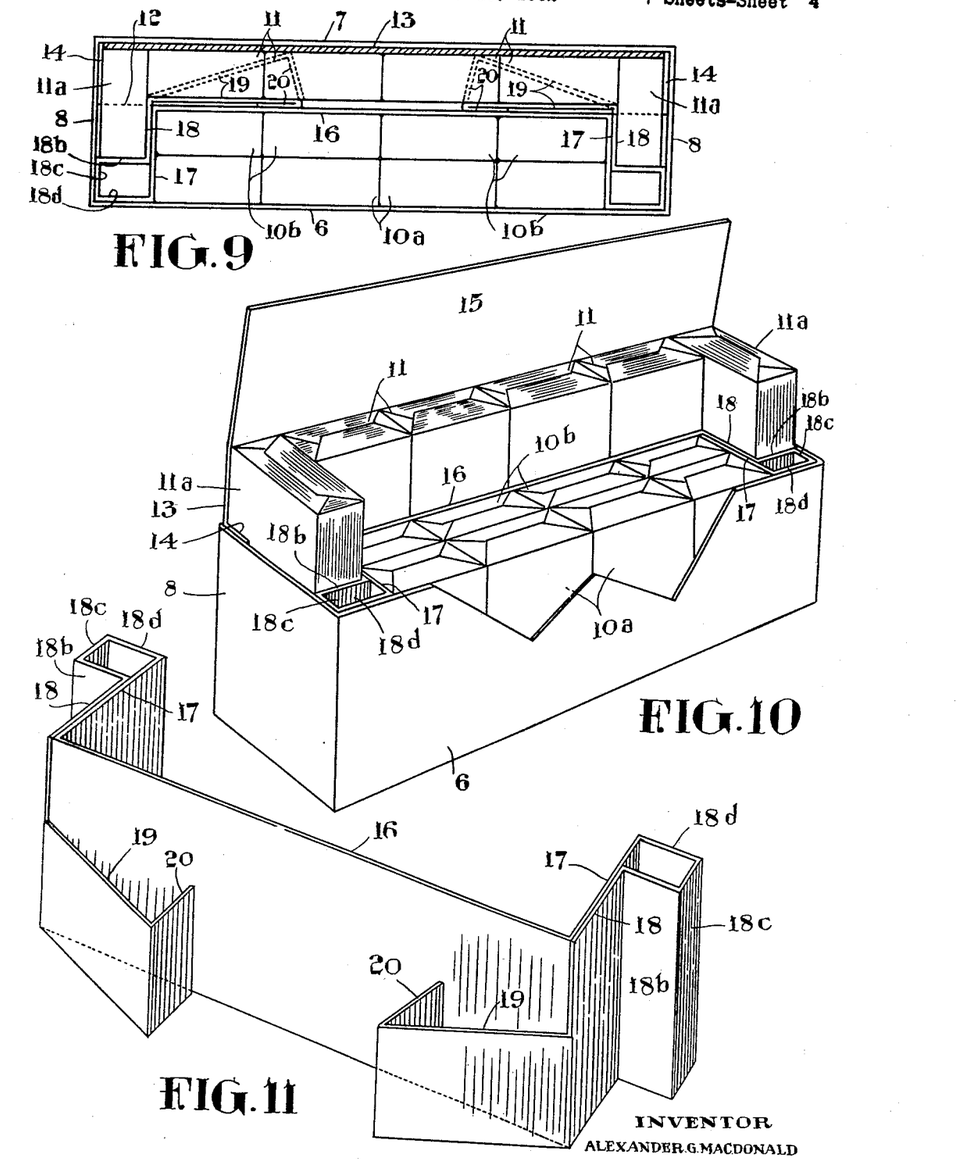
Fig. 9 is a top plan view of the modified construction shown in Fig. 8.
Fig. 10 is a perspective view of the construction illustrated in Figs. 8 and 9. In this view the parts are shown in display position.
Fig. 11 is a perspective view of a modified partition strip and tray support embodied in the construction illustrated in Figs. 8 to 10 inclusive.
Figure 12:
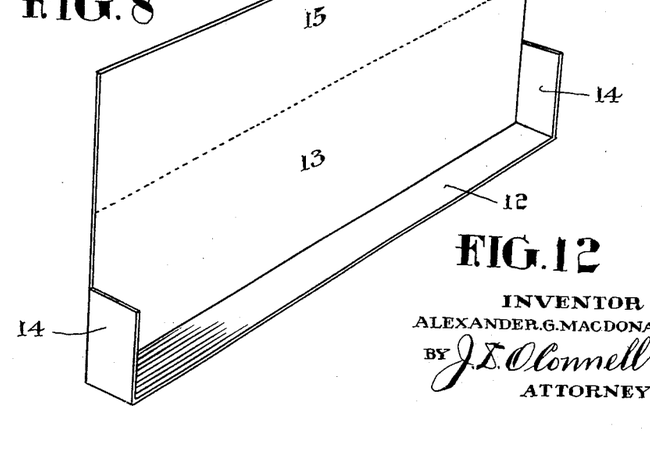
Fig. 12 is a perspective view of a vertically displaceable tray embodied in the construction illustrated in Figs. 8 to 10 inclusive.
Figure 13:
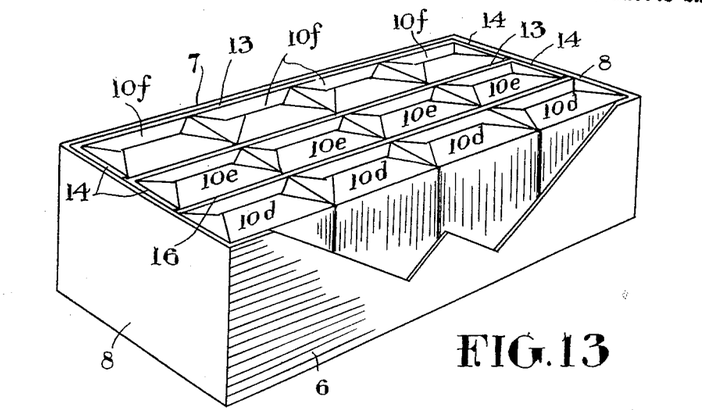
Fig. 13 is a perspective view illustrating a further modification.
Figures 14, 15:
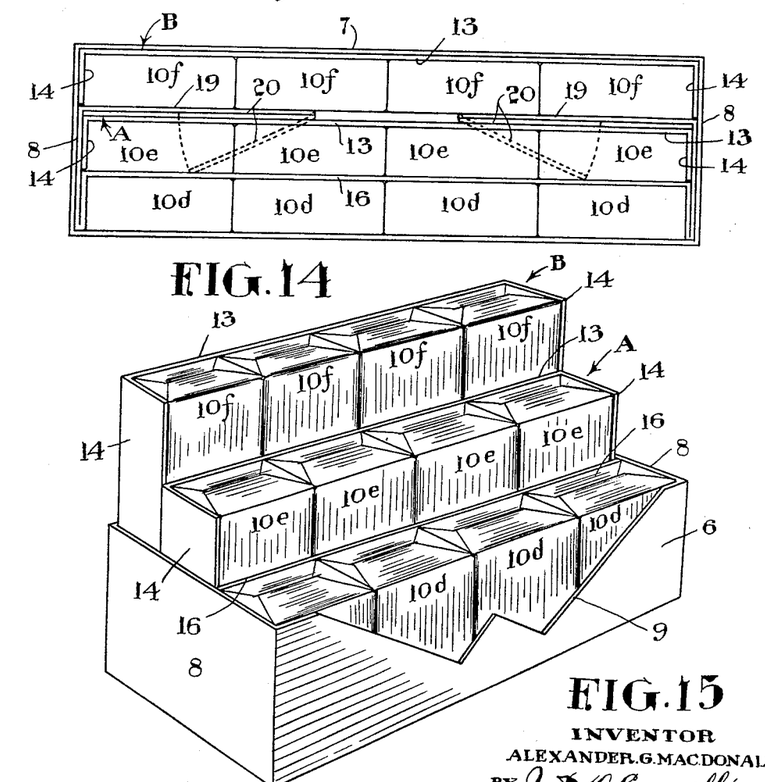
Fig. 14 is a top plan view of the construction appearing in Fig. 13.
Fig. 15 is a view similar to Fig. 13 but showing the parts in full display position.
Figure 16:
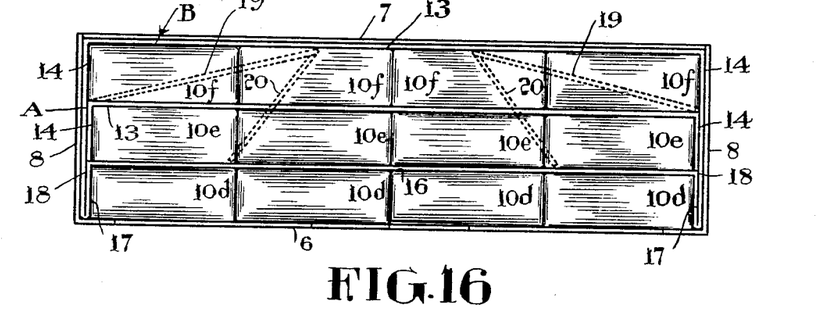
Fig. 16 is a top plan view of the arrangement illustrated in Fig. 15.
Figure 17:
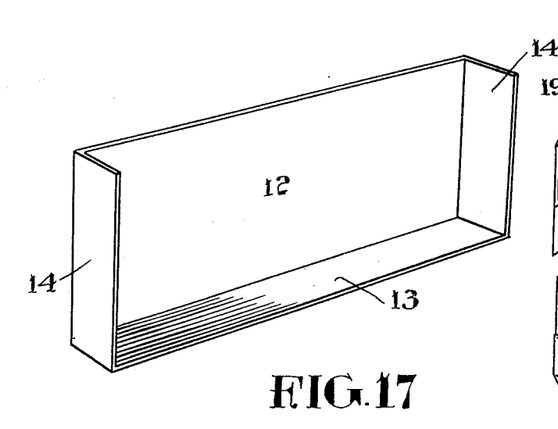
Fig. 17 is a perspective view of one of the two vertically displaceable trays forming part of the construction illustrated in Figs. 13 to 16 inclusive.
Figure 18:
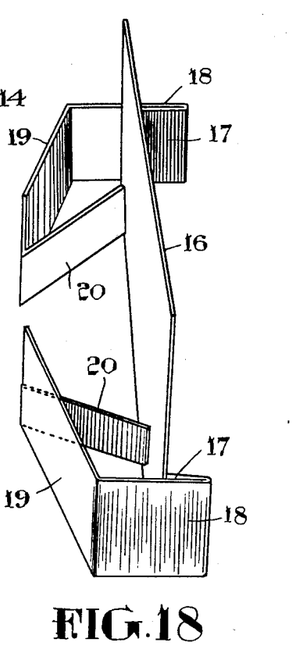
Fig. 18 is a perspective view of a combined partition strip and tray support also forming part of the construction illustrated in Figs. 1 to 16 inclusive.

As shown to advantage in Fig. 10, upward displacement of the tray carrying the packages 11 and 11a causes the upper portions of these packages to be projected to a display position above the packages 10a and 10b of the front and intermediate rows. This upward displacement of the tray also permits the tray supporting members 19 and their flap extensions 20 to assume a tray supporting position as previously described, such position being indicated by dotted lines in Fig. 9.

In the modification illustrated in Figs. 13 to 18 inclusive three rows of packages designated 10d, 10e and 10f are arranged in the outer casing and the packages 10e and 10f of the intermediate and rear rows are arranged in separate trays adapted to be supported at different elevations when in their package display position. As herein shown the packages 10d of the front row are fitted between the front outer casing wall 6 and the partition strip 16. The partition strip 16 is made substantially in the same manner as described in connection with Figs. 1 to 7 inclusive except that in this case the flaps 20 are made of a height equal only to approximately one-half the height of the attached tray supporting members 19. As shown to advantage in Fig. 14 the packages 10e of the intermediate row are contained in a vertically displaceable tray A arranged in the outer casing immediately behind the partition strip 16. The packages 10f of the rear row are contained in a similarly vertically displaceable tray B fitted in the outer casing between the first mentioned tray and the rear wall 7. The tray supporting members 19 normally extend lengthwise of the casing between the packages 10f and the rear wall of the tray carrying the packages 10e, the flaps 20 being folded to lie between the portions 19 and the adjacent rear wall surface of said tray. When the tray A containing the packages 10c is raised to the position shown in Fig. 15, the flaps 20 are free to assume the dotted line position indicated in Fig. 14 and serve, in this position, to support said tray with the packages 10e projected a certain distance above the front packages 10d. If it is desired to also display the packages 10f of the rear row the tray B containing these packages is raised to the position shown in Fig. 15. As the bottom wall of this tray clears the upper edges of the tray supports 19, these supports together with the flaps 20 assume the dotted line position indicated in Fig. 16 so that the tray containing the packages 10f is supported by the members 19 at a higher level than the tray which contains the packages 10e and is supported by the flaps 20.

In each of the arrangements described in the foregoing the tray supports are formed as part of a partition strip interposed between adjacent rows of packages contained in the outer case. This is not, however, an absolutely essential arrangement since the tray supports may also constitute a part of the outer case as illustrated in Figs. 19 to 22 inclusive.

Figure 19:
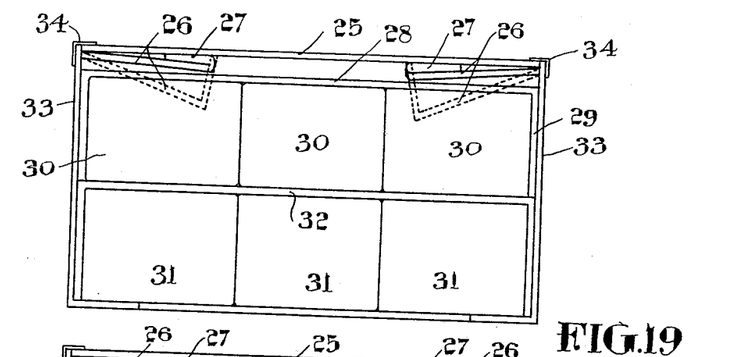
Fig. 19 is a plan view of a modified container in which the tray supports are attached to a wall member of the outer case instead of being attached to the partition strip.

In the construction shown in Fig. 19, the rear wall 25 of the outer case has the lower portions of its side edges extended to provide tray supports 26 terminating in foldable flaps 27. These supports 26 are normally folded inwardly to lie substantially parallel with the inner surface of the wall 25, the flaps 27 being folded to lie between said wall and the opposing surfaces of the tray supports 26. The tray supports are normally retained in this position by means of the rear wall 28 of a vertically displaceable tray 29 constructed in the same manner as the vertically displaceable trays previously described. When the tray 29 is raised to a position such that its bottom wall clears the upper edges of the tray supports 26, these supports, together with their flaps 27, assume the tray supporting position indicated by dotted lines in Fig. 19. The tray 29 carries a row of packages 30 which are separated from the packages 31 of the front row by a partition strip 32 which corresponds with the partition strip in connection with the preceding figures except that it lacks the tray supports. The manner in which the tray supports 26 are formed integral with the rear wall 25 of the outer case is clearly illustrated in Fig. 20 and one method of securing said wall 25 in upright position between the side walls 33 of the outer case is illustrated in Fig. 19, wherein it will be noted that corner binding strips 34 are employed for this purpose.

Figure 20:
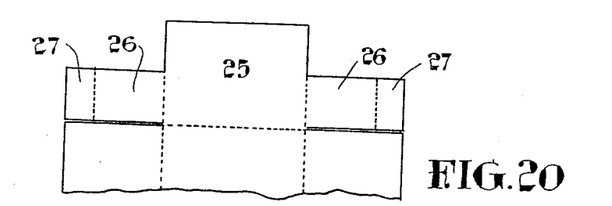
Fig. 20 is a fragmenary plan view of a portion of the blank in which the outer case of the container shown in Fig. 19 is formed. This view illustrates the manner in which the tray supports are formed as part of one of the walls of the outer case.
Figure 21:
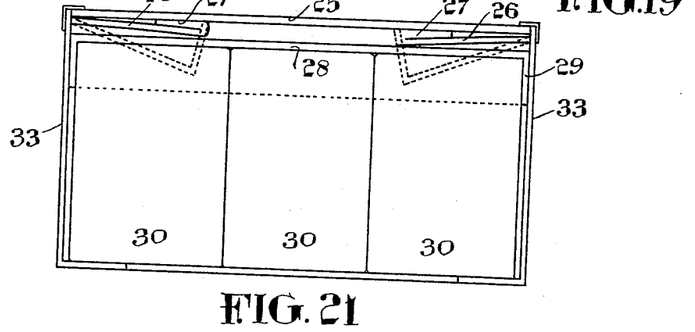
Fig. 21 is a plan view of a container similar to that shown in Fig. 19 but illustrating a different arrangement of the articles contained in the outer case.
Figure 22:
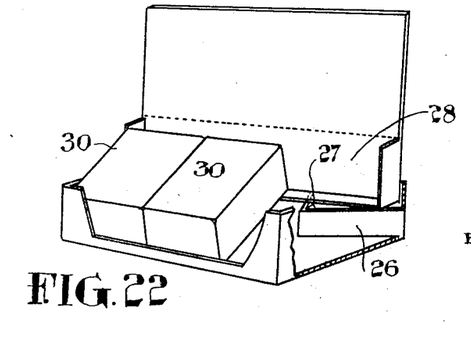
Fig. 22 is a perspective view, partly broken away, of the container illustrated in Fig. 21. In this view the articles arranged in the outer case are shown supported in their vertically displaced or display position.

In Figs. 21 and 22 I have shown a further modification in which the construction of the outer case and the tray supports is the same as illustrated in Figs. 19 and 20. In this case, however, the packages 30 lie normally flat upon the bottom wall of the outer case instead of being arranged in an upright position. Only the rear ends of these packages are supported by the bottom wall of the vertically displaceable tray 28 so that when this tray is moved upwardly the packages 30 are inclined in the manner illustrated in Fig. 22 and are supported in this position by engagement of the tray supports beneath the bottom wall of the tray.

Having thus described my invention what I claim is:—

1. A display container comprising a casing, a vertically displaceable member arranged therein and supports for sustaining said member in its vertically displaced position, said supports being folded upon themselves and normally confined in a folded condition between said member and a wall of the outer casing and being capacitated to automatically unfold to a supporting position beneath said member as the latter is displaced vertically with reference to the casing.

2. A display container comprising a casing, front and rear rows of packages arranged therein, a vertically movable tray in lifting engagement with the packages of the rear row, said tray being vertically movable to lift the packages of the rear row from a non-display position behind the packages of the front row to a display position projecting above said last mentioned packages and tray supporting means normally held in a retracted position between the packages of the front and rear rows, said means being free to assume a tray supporting position beneath the bottom wall of the tray when the latter is raised to a predetermined position during the lifting of the packages of the rear row to a display position.

3. A display container comprising a casing, front and rear rows of packages arranged therein, a tray in lifting engagement with the packages of the rear row, said tray being vertically movable to lift the packages of said rear row to a display position projecting above the packages of the front row, a partition member arranged between the packages of the two rows and provided with tray supporting members adapted to automatically assume a tray supporting position beneath the bottom of the tray when the latter is raised to lift the packages of the rear row to a display position.

4. A display container comprising a casing, front and rear rows of packages arranged in said casing, a vertically movable tray arranged in said casing and containing the packages of the rear row, a partition member arranged in the casing between the two rows of packages, said partition member being provided with tray supporting extensions normally held in retracted position against the body of the partition by engagement with the packages of the rear row but adapted to automatically assume a tray supporting position beneath the tray when the latter is raised to a predetermined elevation during the raising of the rear packages to a display position.

5. A display container comprising a casing, front and rear rows of packages arranged therein, a vertically displaceable tray containing the packages of the rear row, a partition member arranged in the casing between the two rows of packages, said partition member comprising a strip arranged on edge and having reversely folded portions thereof normally confined, in the folded condition, between the two rows of packages, said folded portions being adapted to automatically unfold to a tray supporting position beneath the bottom wall of the tray when the latter is elevated to a predetermined position for lifting the packages of the rear row to a display position projecting above the packages of the front row.

6. A display container comprising a casing, front and rear rows of packages arranged therein, a vertically displaceable tray containing the packages of the rear row, and a partition between the packages of the two rows comprising a vertically disposed strip of material having its lower edge resting on the bottom wall of the casing and having its end portions bent forwardly and then rearwardly to provide double ply end wall members extending forwardly from the body portion of the strip and fitted between the end walls of the casing and the outer sides of the terminal packages of the front row, the outer plies of said end wall members having their lower rear edge portions extended to provide foldable tray supporting members which are normally held in a folded and inoperative condition against the rear side of the body portion of the strip by engagement with the packages of the rear row, said tray supporting members being adapted to automatically unfold to assume tray supporting positions beneath the bottom wall of the tray when the latter is elevated to a predetermined position to raise the packages of the rear row to an upwardly projected display position clear of said tray supporting members.

7. A display container comprising an outer casing, front and rear rows of packages arranged therein, a vertically displaceable tray containing the packages of the rear row, a partition strip arranged in the casing between the two rows of packages, said strip having foldable tray supporting extensions at the rear side thereof extending from the ends towards the centre of the strip and normally held in an inoperative, folded condition adjacent the side of the strip by engagement with the packages of the rear row, said extensions being free to unfold to an operative position beneath the bottom of the tray when the latter is elevated to a predetermined height to lift the packages of the rear row to a display position.

8. A display container comprising an outer casing, front, rear and intermediate rows of packages arranged therein, vertically displaceable trays containing the packages of the rear and intermediate rows, a partition member arranged between the packages of the front and intermediate rows and having tray supporting extensions fitted between the packages of the rear row and the opposing rear wall of the tray containing the packages of the intermediate row, said tray supporting extensions having portions of unequal height, the portions of greater height being adapted to assume a tray supporting position between the tray containing the packages of the rear row when this tray is elevated to a predetermined height and the portions of lesser height being adapted to assume a tray supporting position between the tray containing the packages of the intermediate row when this last mentioned tray is also elevated to a predetermined height.

9. A display container comprising an outer casing including front, rear, bottom and end walls, a vertically displaceable tray arranged therein with the rear wall of the tray lying adjacent the rear wall of the casing, said rear wall of the casing having the lower portions of its side edges extended to provide tray supports normally confined in an inoperative position between the inner surface of said wall and the rear wall of the tray, said supports being adapted to automatically assume an operative position beneath the tray when the latter is raised to a predetermined height.

ALEXANDER G. MACDONALD.